United States Patent [19]
Martin

[11] Patent Number: 5,638,077
[45] Date of Patent: Jun. 10, 1997

[54] DIFFERENTIAL GPS FOR FLEET BASE STATIONS WITH VECTOR PROCESSING MECHANIZATION

[75] Inventor: Edward H. Martin, Anaheim, Calif.

[73] Assignee: Rockwell International Corporation, Newport Beach, Calif.

[21] Appl. No.: 433,654

[22] Filed: May 4, 1995

[51] Int. Cl.$^6$ .................................................. G01S 5/02
[52] U.S. Cl. ........................................... 342/357; 342/457
[58] Field of Search ................................ 342/357, 451

[56] References Cited

U.S. PATENT DOCUMENTS

5,495,257  2/1996  Loomis .................... 342/357

*Primary Examiner*—Gregory C. Issing
*Attorney, Agent, or Firm*—William C. Cray; Philip K. Yu

[57] ABSTRACT

A fleet management system for a base station to obtain differential GPS corrections to the location information for the fleet vehicles. A fleet vehicle first sends the information of "position solution" back to the base station with time annotation, where the position solution only needs to specify position, velocity and the satellites observed. The base station, which already has an a priori fixed position vector for its location, generates a potential solution set for all the possibly observable satellites. This allows the base station to vector-process to determine the differential correction for each combinatorial set of satellites observed by the fleet vehicle. This way, equivalent differential GPS accuracy of 10 meters or better can be achieved for the fleet management system without imposing the communications burden to the system.

11 Claims, 10 Drawing Sheets

CORRECTED VEHICLE POSITION AND VELOCITY UPDATING

$$P_j = P_j - \Delta P_m$$

$$V_j = V_j - \Delta V_m$$

DISPLAY OR STORE AS REQUIRED

FIGURE 11

DIFFERENTIAL GPS FOR FLEET BASE STATIONS WITH VECTOR PROCESSING MECHANIZATION

FIELD OF THE INVENTION

The present invention relates to global positioning system (GPS) technology and more particularly to automatic vehicle location systems based on differential GPS (DGPS) technology for fleet management purposes.

ART BACKGROUND

Primarily designed and developed for navigation by the U.S. Department of Defense in the late 70's, GPS has revolutionized the positional data collection techniques not only in surveying and mapping but also in numerous other areas. One such area is an automatic vehicle location system ("AVLS") for use in a fleet management system, where locations of fleet vehicles are tracked by a base station for both real-time and post-processed systems.

GPS generally provides real-time positional information as to the location of a vehicle equipped with a GPS receiver. However, for tracking locations of fleet vehicles in a fleet management environment, only the relative position of each vehicle unit to a fixed base station need be determined for post-processed vehicle data base management. One such system is the Fleetmaster™ system available from Rockwell International, Newport Beach, Calif., the assignee of the present application.

Figure 1:
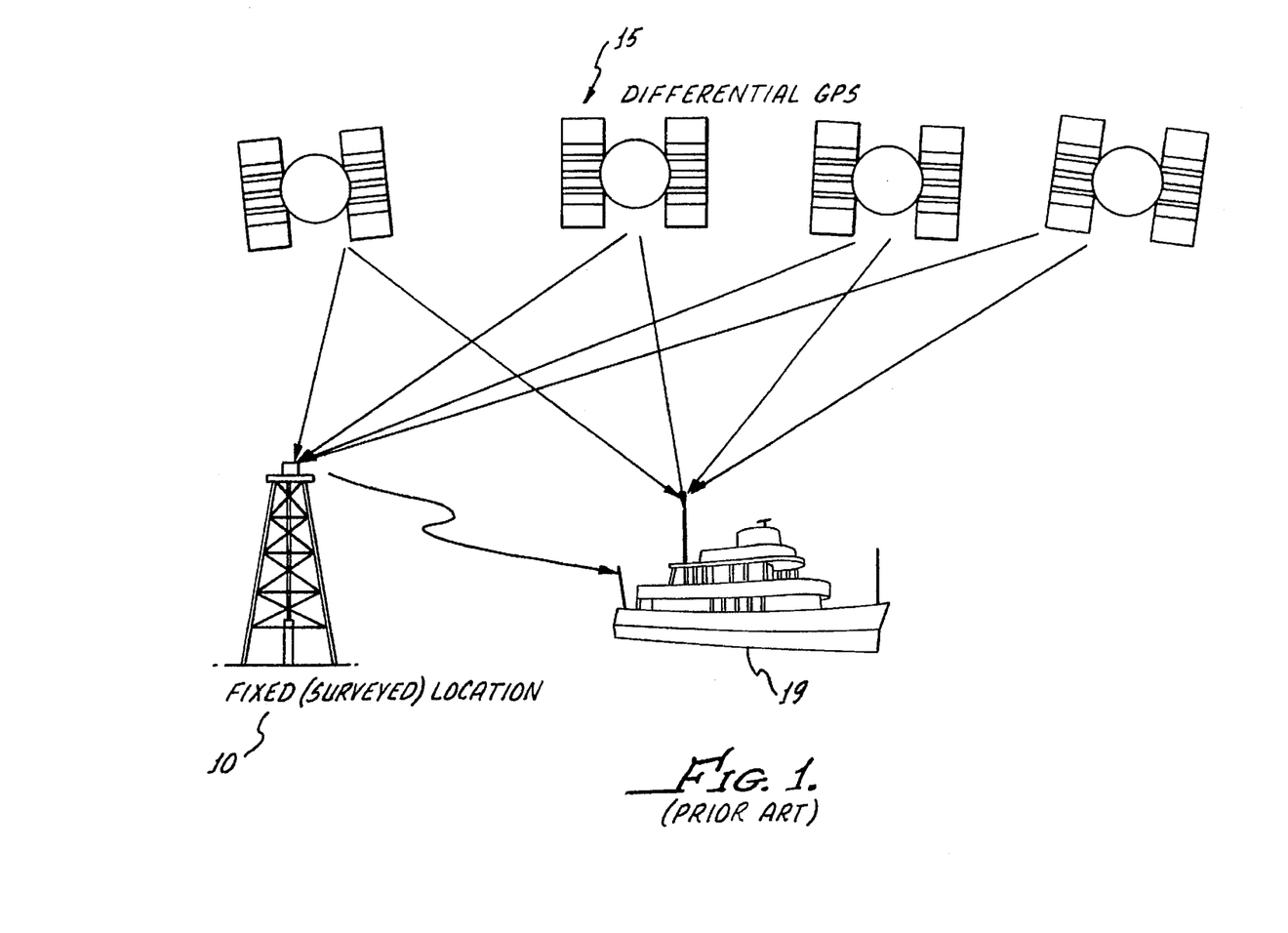
FIG. 1 is a simplified diagram of a typical DGPS system.

FIG. 1 illustrates a typical DGPS system, where a base station antenna 10 has a fixed, or surveyed, location for observing GPS satellites 15 using a geodetic GPS receiver. Note that the "position" in GPS realm means geodetic latitude, geodetic longitude and geodetic height. The base station, through the GPS receiver, then calculates error parameters in each satellite range. The correction parameters are broadcast to all mobile units 19 for all satellite ranges. Upon receiving the correction parameters, the mobile units 19 apply the correction parameters to derive their accurate position.

With DGPS, accuracy can be improved to within 10 m or less, e.g. the length of a bus or truck. Therefore, it is able to provide enough accuracy to effectively bypass the Selective Availability ("SA") restrictions intentionally imposed by the U.S. government. However, to implement DGPS, a typical implementation would require the base station to transmit an RTCM ("Radio Technical Commission for Maritime Services")-104 message to the fleet for the fleet vehicles to update their individual positions. As will be explained further, this proves to be an inefficient use of the communications channel.

For fleet management systems such as an AVLS, GPS-equipped vehicles allow the base station to determine where the fleet vehicles are located. In AVLS, each GPS receiver aboard the vehicle acquires position, velocity and heading, i.e. "locations", information, as well as a host of others, and transmits the information back to the base station through a communications link such as radio or cellular connection. In the meantime, the base station determines the error information as to each satellite and broadcasts the information to each fleet vehicle through an RTCM-104 message.

The problem of this conventional AVLS is that in a fleet environment, the forwarding message by the base station after receiving, calculating and packaging information consumes quite a bit of the communications channel, thus making this paradigm less cost effective. Because the base station must send all the differential correction data to all fleet receivers, this message forwarding creates a costly burden upon the system.

Figure 2:
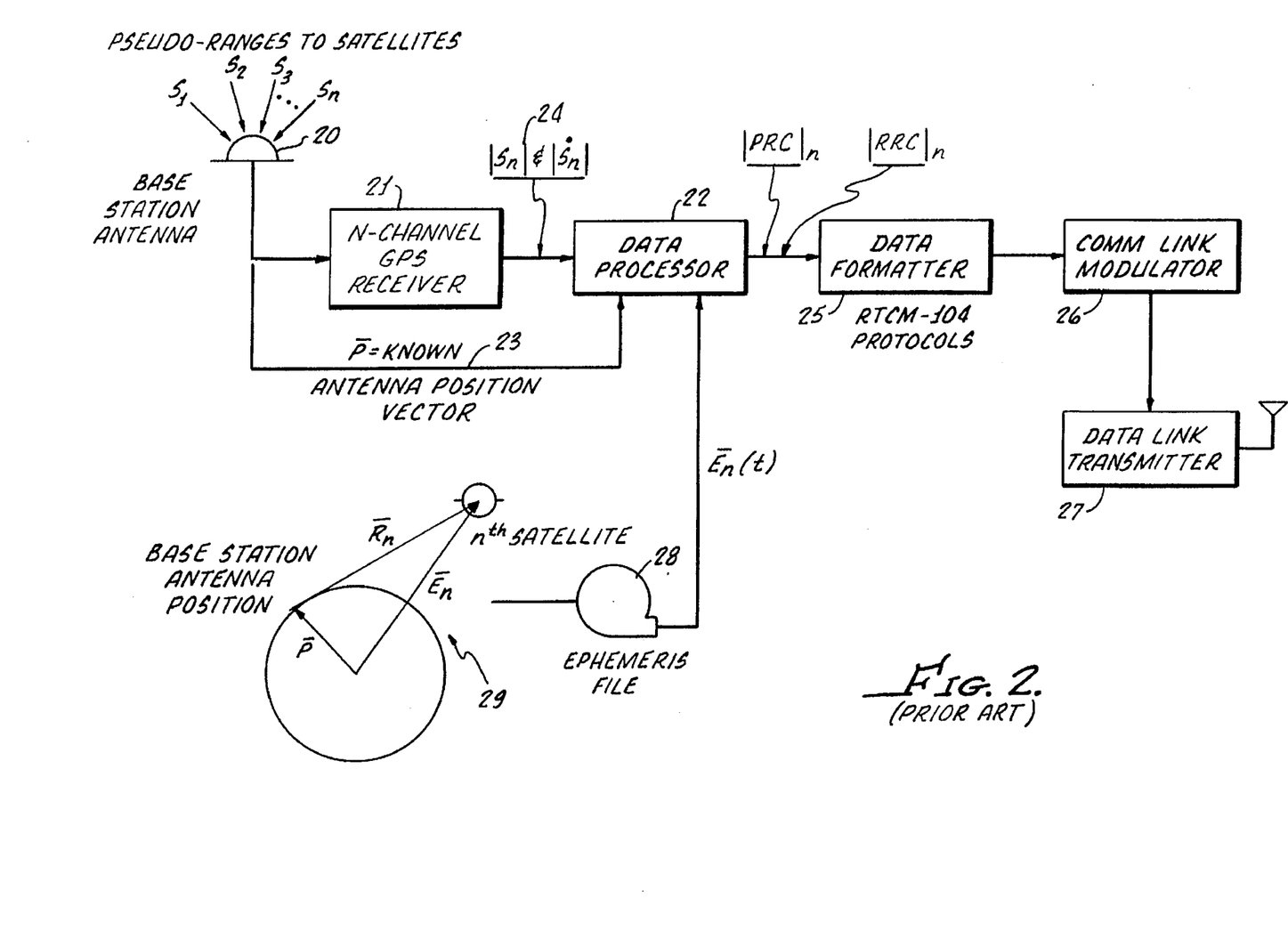
FIG. 2 is a simplified diagram of another DGPS system.

Another conventional DGPS base station is illustrated in more detail in FIG. 2. A base station antenna 20 is set to acquire pseudo-ranges ("$S_1 \ldots S_n$") from the earth orbiting satellites. The pseudo-ranges $S_1 \ldots S_n$ are received through a base station GPS receiver 21 such that they can be processed by a data processor 22. Note that the GPS receiver 21 should be equipped with enough channels ("N channels") to accommodate all the GPS satellites available. Concurrently, an antenna position vector P, which represents the already known antenna position, is input to the data processor 22 for processing. Also, a vector $E_n(t)$ representing the position of the n-th satellite relative to the center of the earth is input to the data processor 22 for determining a vector $R_n$ for the n-th satellite, which represents the vector range between the n-th satellite and the base station antenna position. Note that the vector $E_n(t)$, i.e. coordinates of the n-th satellite at time "t" as it is broadcast by the n-th satellite, is obtained from an ephemeris file 28 derived from each n-th satellite data message in earth-centered coordinates as shown in the vector chart 29. It is to be noted that in the present application, the notation for a vector is indicated in bold styles.

The data processor 22 obtains the DGPS corrections for the n-th satellite according to the following computation:

$E_n - P = R_n$, and $E^*_n = R_n^*$, since $P^* = 0$ (Note: "*" denotes rate of change in time, or the "derivative", of the variable) and abs $(R_n)$ – abs $(S_n)$ = abs $(PRC)_n$, and abs $(R^*_n)$ – abs $(S_n^*)$ = abs $(RRC)_n$ = DGPS corrections for n-th satellite.

The DGPS corrections as determined by abs $(PRC)_n$ ("pseudo-range correction") and abs $(RRC)_n$ ("pseudo-range rate correction") can then be formatted by a data formatter 25 according to the RTCM-104 protocols. Thereafter, the RCTM-104 message is modulated by a communications link 26 before it is transmitted by a data link transmitter 27 to the remote fleet receivers. It should be noted that a presumption has been made in this implementation that only "n" satellites are in view of any one base station and the number "n" should be fully accommodated by the N-channel receiver at the bast station, i.e. $n \leq N$. As can be understood by those skilled in the art, the communications link 26 and data link transmitter 27 can easily be overburdened by the RTCM-104 message, which is broadcast to all remote units by the base station.

Figure 3:
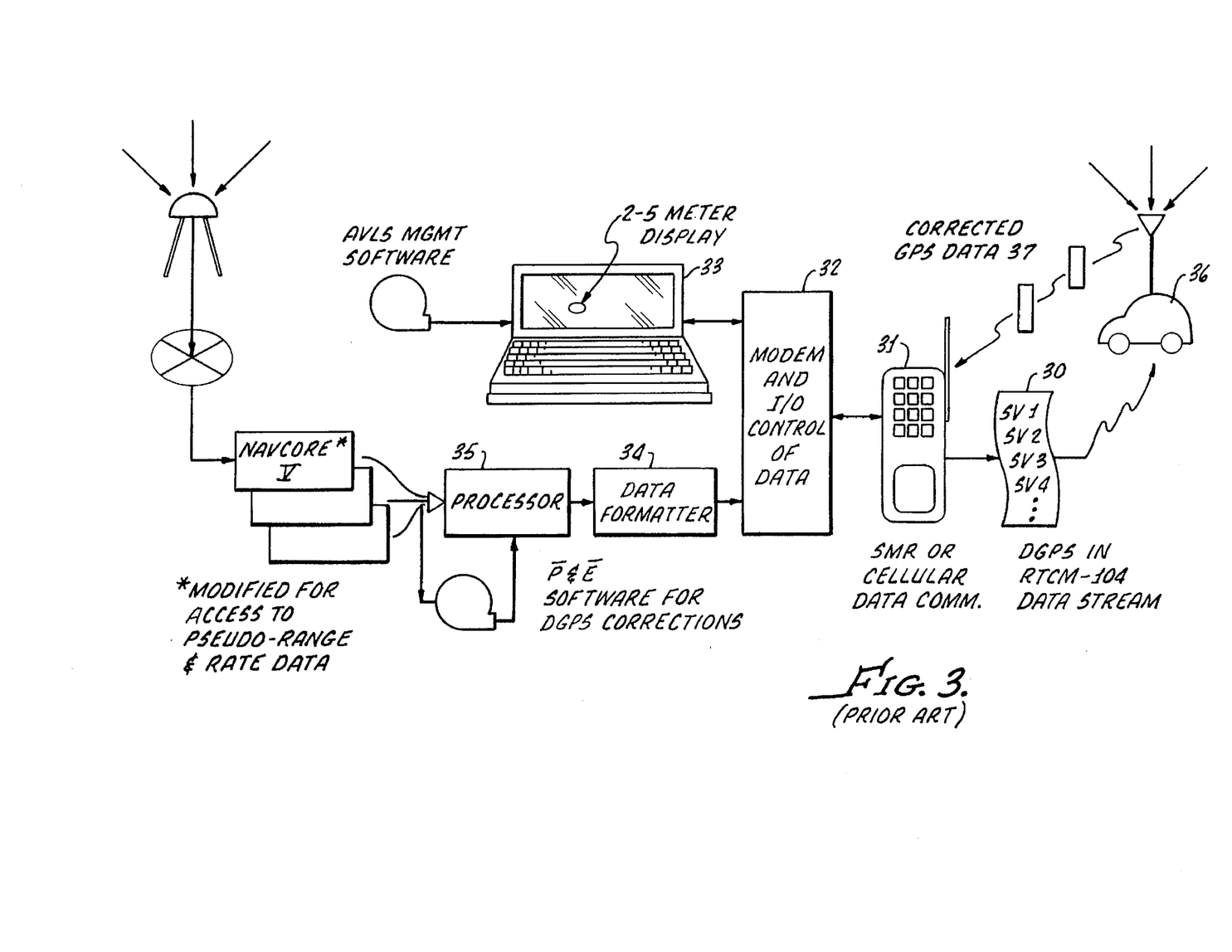
FIG. 3 illustrates a DGPS base station configuration with active forward RTCM-104 transmission.

FIG. 3 illustrates a DGPS base station configuration with active forward RTCM-104 transmissions. The DGPS corrections obtained by the data processor 35 are formatted by the data formatter 34 so they can be modulated by a modem 32 for transmission. The modulated data are transmitted in RTCM-104 data stream 30, which identifies the DGPS corrections associated with all observable satellites, e.g. $SV_1, SV_2, SV_3, SV_4, \ldots SV_n$, by a communications link 31, such as SMR ("Specialized Mobile Radio") or cellular, to a fleet vehicle 36. The DGPS corrections are processed by the vehicle's GPS receiver to obtain corrected GPS data 37 and reported back to the modem 32 through the communications link 31.

Those skilled in the art can readily appreciate that while this system achieves DGPS accuracy, a high data rate is required in base station transmissions to prevent DGPS data latency. Also, there is less reporting time available for fleet vehicles, although air time usage is significantly increased.

Therefore, it is desirable to obtain accurate DGPS corrections for the fleet vehicles for the fleet operator at the base station for fleet management purposes.

Also, it is desirable to use the DGPS corrections to obtain corrected DGPS positions for the base station without incurring the data transmission cost.

Further, it is desirable to obtain DGPS positions without the burden of having to broadcast a forward message to link all the fleet vehicles.

Further, it is desirable to obtain DGPS accuracy without significantly altering the existing communications protocol, while taking advantage of the existing communications protocol.

SUMMARY OF THE INVENTION

A novel differential GPS system for fleet base stations is disclosed. Now a fleet vehicle sends the information "position solution" back to the base station with time annotation. The position solution only needs to specify position, velocity and the satellites observed. The base station, which already has an a priori fixed position vector for its location, generates a potential solution set for all the possibly observable satellites. This allows the base station to vector-process to determine what the differential correction is for each combinatorial set of satellites observed by the fleet vehicle. This way, equivalent differential GPS accuracy of 10 meters or better can be achieved for the fleet management system without imposing the communications burden to the system.

A fleet management system for a base station to provide differential GPS corrections to fleet vehicles is disclosed. The base station may use an N-channel base station GPS receiver for observing pseudo-range and pseudo-range rate signal vectors from GPS receivers. The fleet vehicles also use fleet GPS receivers for observing GPS satellites, which generate signals of uncorrected time-annotated GPS location data and identification of the GPS satellites. The fleet vehicles transmit the uncorrected time-annotated GPS location data and identification to the base station through an I/O control for receiving from the fleet vehicles. Time-annotated vehicle data record can then be generated, comprising position, velocity vectors and satellite identification. To provide DGPS corrections, the fleet management system has a processing unit for determining a maximum number of possible satellite combinatorials out of the fleet-observed satellites taken 4 at a time, for forming annotated pseudo-range and pseudo-range rate signal vectors as a specific subset of M, for generating position and velocity vectors using navigation computation for each annotated pseudo-range and pseudo-range rate signal vectors. The processing unit can thus calculate DGPS correction and update the uncorrected GPS location data.

BRIEF DESCRIPTION OF THE PREFERRED EMBODIMENT

Additionally objects, features and advantages of the present invention will become apparent from the following detailed description, wherein.

DETAILED DESCRIPTION OF THE DRAWINGS

Figure 4:
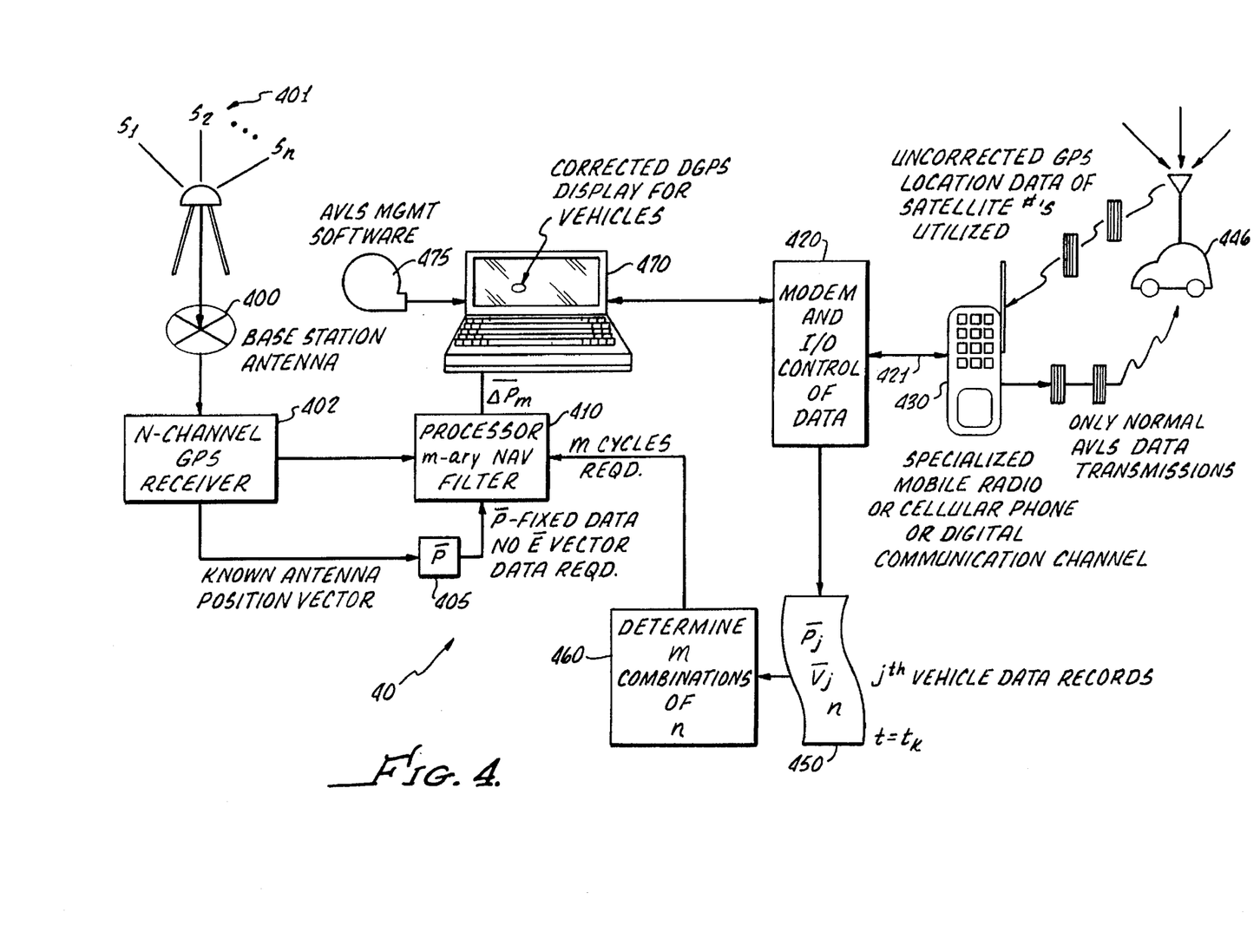
FIG. 4 is a simplified system diagram of a fleet management system.

Reference is to FIG. 4, where a simplified system diagram of a fleet management system 40 using vector processing in accordance with the present invention is shown. The major functional components will be described as follows:

Base Station Antenna

A base station antenna 400 is preferably located at a defined and fixed physical location established by the fleet operations management. It is generally preferable to ensure that the location is known precisely within a selected mapping or navigation coordinate frame utilized by the fleet, and is available to a base station processor 410 as an a priori position vector as follows:

P=a 3-dimensional position vector for the base station antenna. Note that the position vector P 405 may be established by means of exact surveying (not shown) or by means of self-surveying using a base station GPS receiver 402, which are methods well understood by those skilled in the art.

Base Station GPS Receiver

A base station GPS receiver 402 may be a GPS receiver, or receiver/processor, which is capable of providing signals from all and any of N separate GPS satellites, and thus is capable of at least N-channel operation. One example is the NavCore® V GPS receiver from Rockwell International, Newport Beach, Calif. In general the value of "N" could be any number from 4 to 12 depending upon what the maximum number of satellites are deemed to be visible to the antenna from the base station antenna location 400. Note that the number "N" is typically what the manufacturer of the GPS receivers sets in factory. As shown in FIG. 4, at any instant of time, the base station GPS receiver 402 will be provided with the following satellite signals 401 from the GPS satellites in view:

$S_n = n^{th}$ satellite pseudo-range signal from satellite "n", where n≤N. Additionally, the base station GPS receiver 402 should preferably be capable of receiving and processing the pseudo-range rate, or, $S_n^* = n^{th}$ satellite pseudo-range rate signal from satellite "n".

Both $S_n$ and $S_n^*$ are measured and annotated in time by the base station GPS receiver 402 and they form the basic measurement observables for the DGPS implementation in accordance with the present invention.

Base Station Processor

A base station processor 410, coupled to the N-channel GPS receiver 402, provides the capability to control and manage the AVLS data processing. The base station processor 410 may perform vector processing (to be described), normal fleet management data flow, i.e. AVLS management software 475, and eventually information display 470. The vector processing mechanization in accordance with the present invention currently resides within the Base Station Processor.

It should be noted that the processor 410 and information display 470 may typically be implemented with a desk-top mini-computer capable of running the AVLS management software 475.

Data Modem

Referring to FIG. 4, a data modem 420 is an interface between the base station and its fleet in the fleet management system 40. The data modem 420, under the control of the base station processor 410, establishes the means for information exchange between the fleet vehicles 440 and the base station via a communications network 421. In particular, for base station processor's vector processing, the modem 420 may provide a data base 450 as the data are received from each of the fleet vehicles 440 (the "j-th" vehicle). The data comprise the following:

$P_j$=Fleet vehicle position vector for the $j^{th}$ vehicle, $V_j$=Fleet vehicle velocity vector for the $j^{th}$ vehicle, n=specific GPS satellite numbers corresponding to the identification of "n" satellites that are employed for the vehicle's navigation solution.

This data base 450 is also annotated in time ($t=t_k$) as received at the fleet vehicle 440 where $t=t_k$ is the applicable GPS time associated with the data base 450.

It should be noted that time annotation is essential to fleet management data base in that it allows the data base to be viewed and managed at a later time.

Communications Network

A communications network 421 provides the means for communication between the base station, via the modem 420, and the fleet vehicles 440. Vector processing for the fleet management system 40 in accordance with the present invention may be implemented by any form of the network as indicated in FIG. 4 including, but not limited to, the following:

Specialized Mobile Radio ("SMR")

Cellular Phone

Dedicated digital communications channels

It should be noted that one of the major efficacies of the base station fleet management system with vector processing in accordance with the present invention is that it accomplishes the desired DGPS accuracy without any burdening of the communications network beyond normal data reporting from the fleet vehicles 440.

Fleet Vehicles

Referring to FIG. 4, the fleet vehicles 440 are distributed throughout the fleet management area. Each fleet vehicle may include a complementary set of a GPS receiver, a data modem, an antenna, and a communication network device which reports messages back to the base station, via the modem 420. The message from fleet vehicles may include $P_j$, $V_j$, and the specific identification set, "n", of satellite signals employed to form a fleet vehicle navigation solution at the fleet vehicle location, and annotated in terms of time of applicability, $t=t_k$.

Note that for the implementation of vector processing, the set of satellites utilized by each of the fleet vehicles 440 is included in the message as an identifying scalar set of numbers, i.e. "n". Note that this information is already reported back to the base station in a receiver such as the NAVCORE V GPS receiver from Rockwell International. It will be up to the previously described data modem 420, or an Input/Output formatter, to extract the necessary information from the message for vector processing in accordance with the present invention.

Vector Processing

With the major functional components described in FIG. 4, the mechanization of vector processing as may be implemented by the fleet management system 40 is described in the following general process flow. It should be noted that the following process flow is described in representative steps which can generally be understood by those skilled in the art and can readily be modified to be implemented by those skilled in the art according to their particular computer systems and environments.

Step 1. Initialization Data

Figure 5:
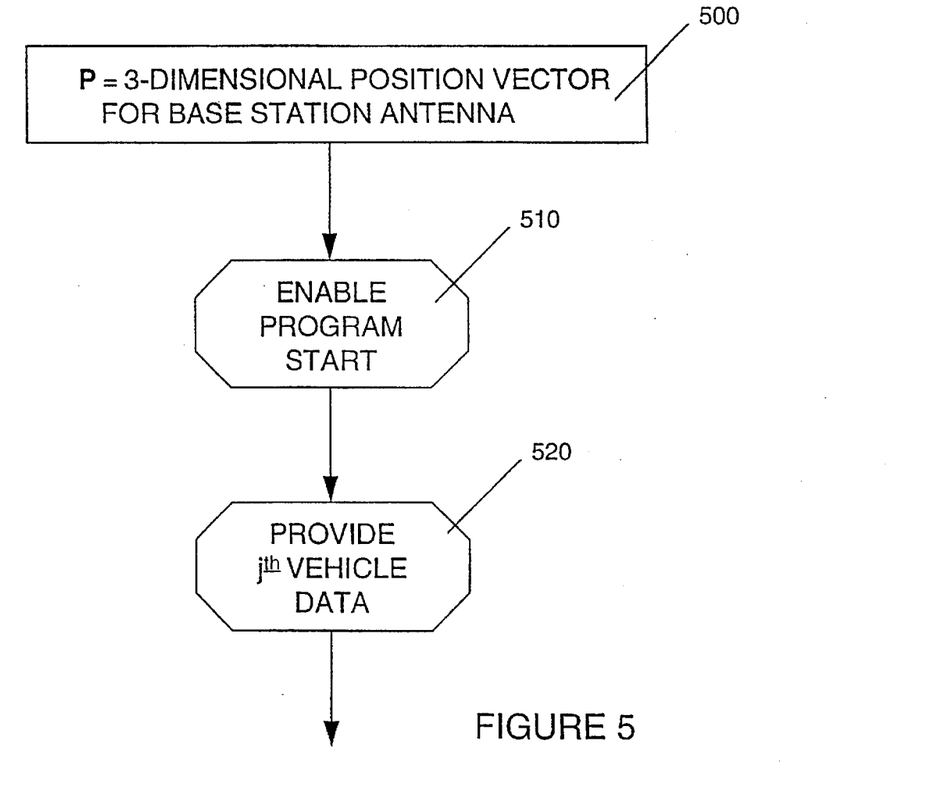
FIG. 5 illustrates the initialization step of the vector processing.

The base station processor 410 is provided the a priori position vector 405 P based on either exact surveying or self-surveying (FIG. 5, 500). This initialization data P may be used, upon power-up of the fleet management system (FIG. 4, 40), to enable the program (FIG. 5, 510).

Step 2. Data Record from j-th vehicle

Figure 6:
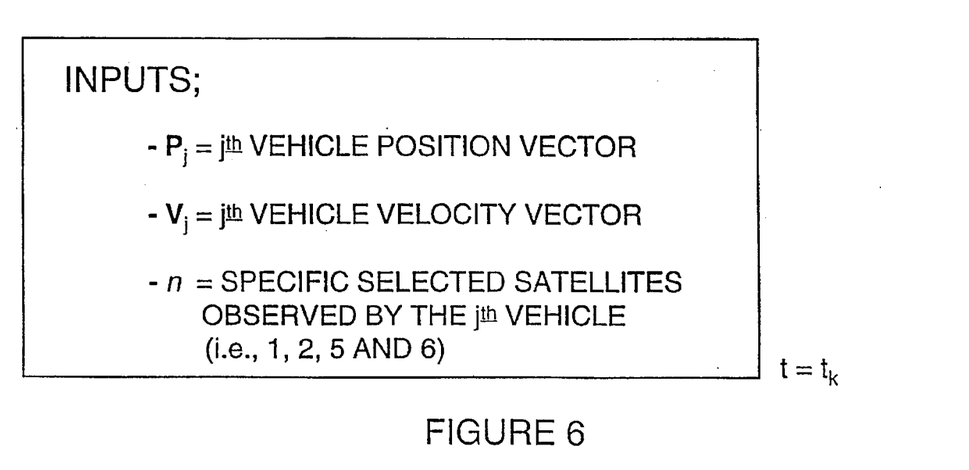
FIG. 6 illustrates a data record from a fleet vehicle.

This data record (FIG. 4, 450), with its GPS time annotated index, $t_k$, is provided to the base station processor (FIG. 4, 410) as an input to the process flow for vector processing (FIG. 5, 520). The data record is illustrated in FIG. 6.

Step 3. Examine and Store j-th Data Base

Figure 7:
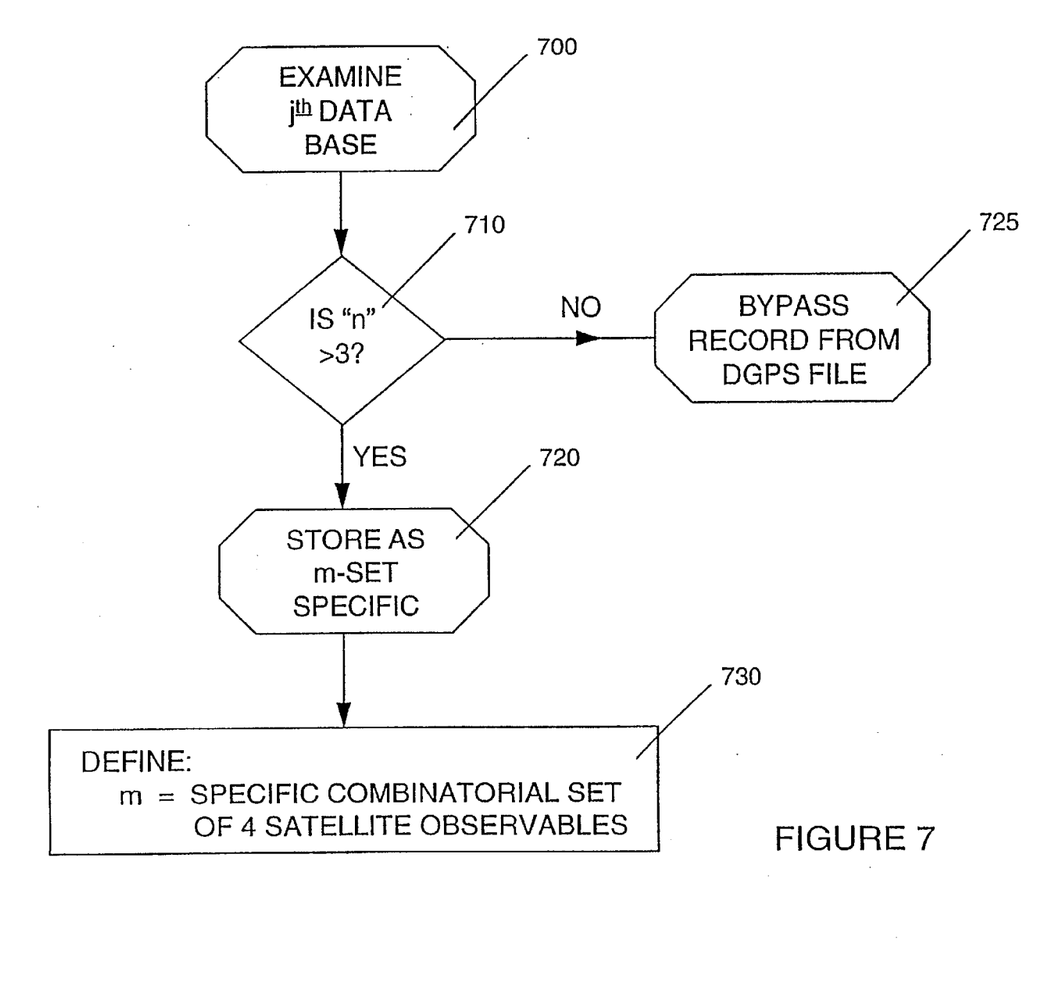
FIG. 7 illustrates the step of data examination and storage.

FIG. 7 illustrates this step. The record from Step 2 is stored, with annotated time index, $t_k$, and examined 700 to determine which specific combination the set of "n" observable satellites represents out of the maximum number of satellites available to both the j-th fleet vehicle 440 and the base station. (The maximum number, "M", of combinations of satellites taken 4 at a time is specified and defined below.)

Note that if less than 3 satellites are observed by the j-th fleet vehicle, this record is bypassed 725 because its lack of observable satellites makes it not amenable to any corrections. Those skilled in the art will recognize that it takes at least 4 observables to form a position solution.

If at least 4 satellites are observed by the fleet vehicle, the j-th record is stored as m-set specific 720, by determining "M" as the maximum number of 4-satellite combinatorials observed by the fleet. However, as will be described later, more than 4 satellites may be employed in certain "overdetermined" cases such that the maximum number "M" will be the maximum number of satellite combinatorials out of the total number of satellites taken 5, 6, or even 7 at a time. For simplicity sake, however, the present description will be in reference to solutions based on 4-a-set combinations.

Step 4. Select Same Observables m-Set for Base Station

Figure 8:
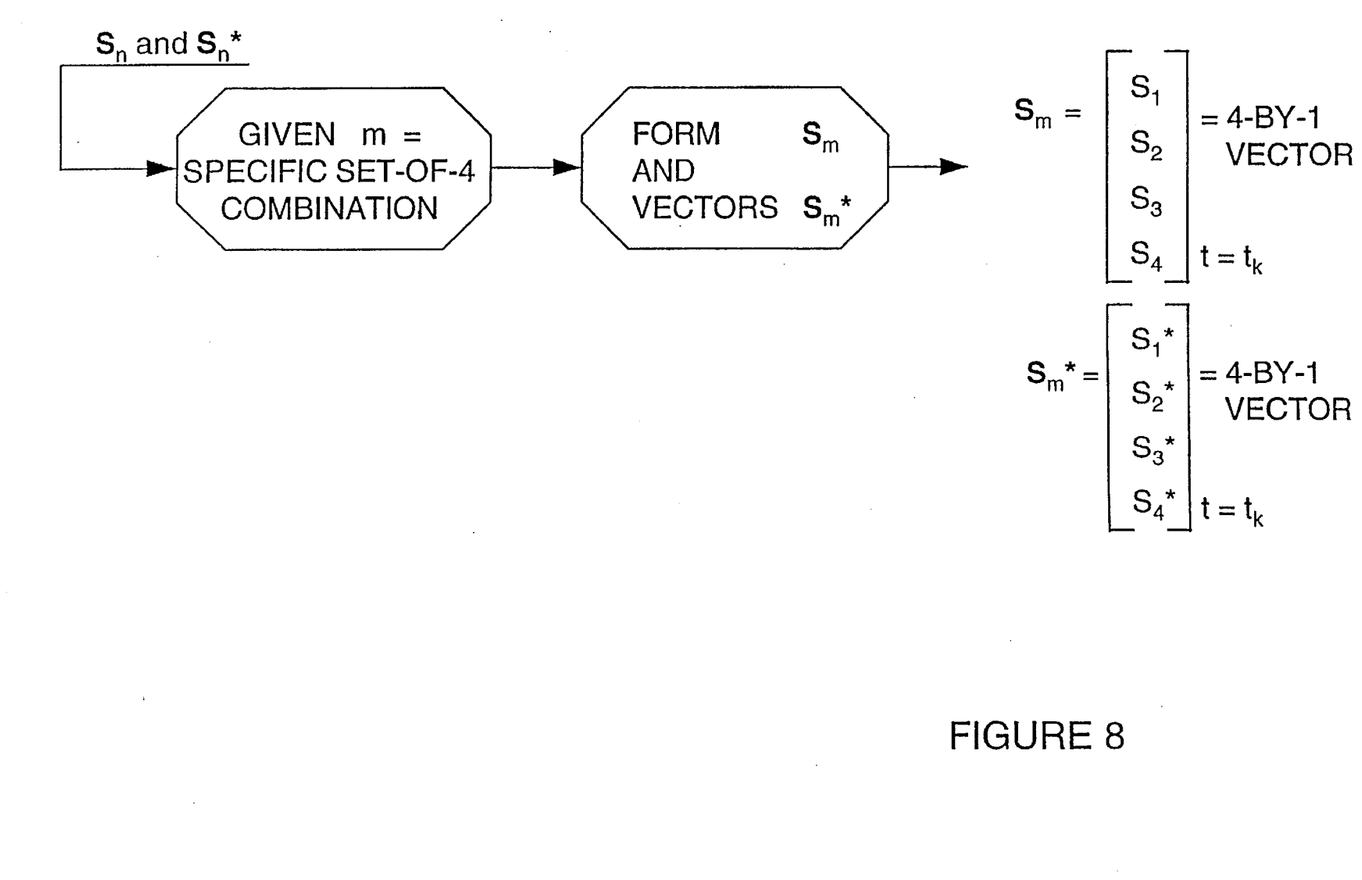
FIG. 8 illustrates the step of formulating the "M" set vectors.

Referring to FIG. 8, with "m" defined from the above, the base station potential observables are ordered to comply with the same set of "n" satellites as viewed from the fleet vehicles to form a base station solution as:

$S_n$=vector of available pseudo-range signals from "n" possible satellites;

$$S_n = \begin{bmatrix} S_1 \\ S_2 \\ S_3 \\ \cdot \\ \cdot \\ \cdot \\ S_n \end{bmatrix} \text{ (at } t=t_k\text{)}$$

=column vector consisting of all pseudo-range signals from base station N-channel receiver (FIG. 4, 402)

and $S_n^*$=similar column of pseudo-range rate signals from base station N-channel receiver.

Given m=specific combinatorial sets of 4 satellite observables, select identical set of 4 observables to form $S_m$ and $S_m^*$. Note that for n=4 satellites observed by the fleet, M is 1, since only 1 4-satellite combinatorial is possible. For n=5 satellites observed by the fleet, M is 5, as represented by the following formula:

$$M=n(n-1)(n-2)(n-3)/4!.$$

Step 5. Form the m-set Navigation Solution

Figure 9:
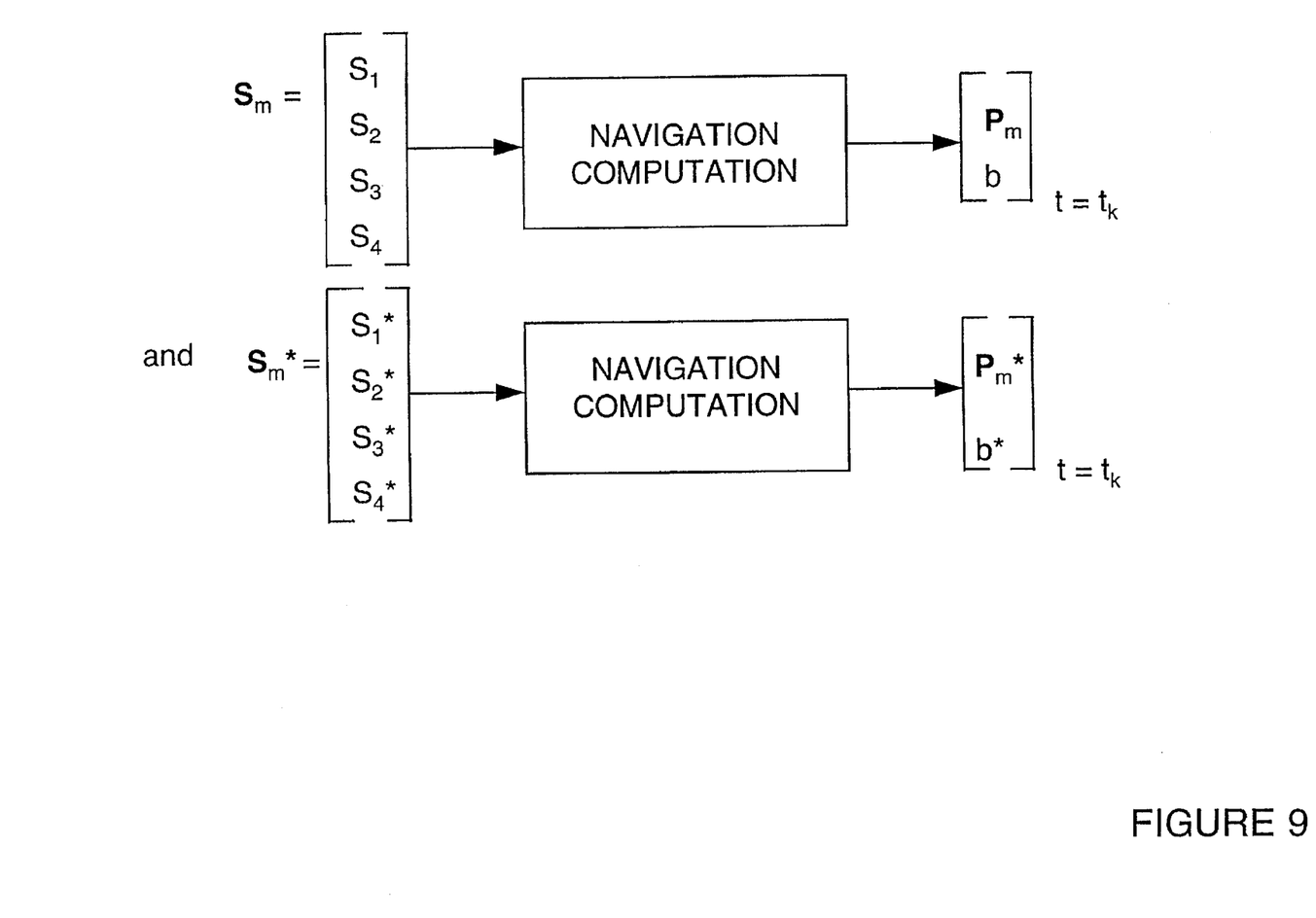
FIG. 9 illustrates the step of navigation processing.

With the m-set measurement observables given in Step 4 above, as provided from the base station GPS receiver, the navigation processing proceeds as illustrated in FIG. 9.

The resultant navigation solutions define a position solution:

$$P_m = \begin{bmatrix} P_x \\ P_y \\ P_z \\ b \end{bmatrix} = \text{vector of position related to specific m-set}$$

at time $t = t_k$ where: b=Base station clock bias estimate. And similarly, $$P_m^* = \begin{bmatrix} P_x^* \\ P_y^* \\ P_z^* \\ b^* \end{bmatrix} = \text{vector of velocity related to specific m-set}$$

of observables at time $t = t_k$.

where: b*=Base station clock drift rate estimate.

Those skilled in the art will recognize that the Navigation Computation blocks indicated in FIG. 9 can be formulated in any of several alternatives such as:

Closed Form simultaneous equations;

Iterative Least Squares filtering estimation;

Iterative Kalman filtering estimation. Note that the general subject of Kalman filtering is available in a paper published by the present inventor, entitled NAVSTAR GLOBAL POSITIONING SYSTEM USER EQUIPMENT NAVIGATION, presented at the Eighth Asilomar Conference on Circuits, Systems, and Computers, December 1974.

Additionally the Navigation Computation blocks may be implemented within the base station processor (FIG. 4, 410), or it may be implemented within the base station GPS receiver (FIG. 4, 402) and simply commanded to select the proper M-set observables $S_m$, and $S_m^*$ as required to accomplish the calculation of Step 5.

Step 6. Determine Corrections for DGPS

Figure 10:
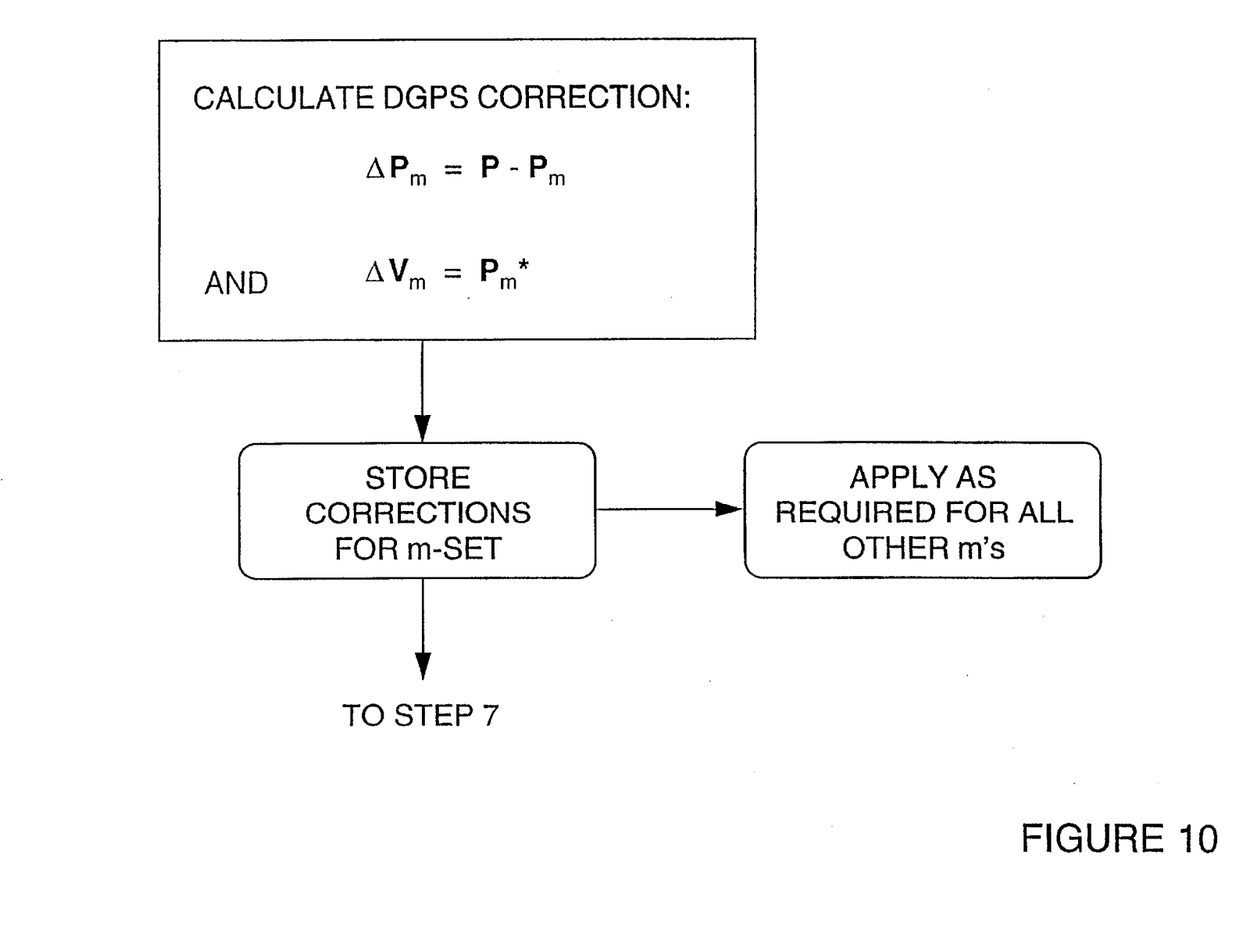
FIG. 10 illustrates the step of determining corrections for DGPS.

With the vectors established above, FIG. 10 illustrates the determination of corrections for DGPS. For each of the m sets, $\Delta P_m = P - P_m$ and $\Delta V_m = S_m^*$ Once the corrections are determined, they are stored for the specific m-set. This step is also applied to all other m's such that there are m number of corrections available.

Step 7. Apply Corrections

Figure 11:
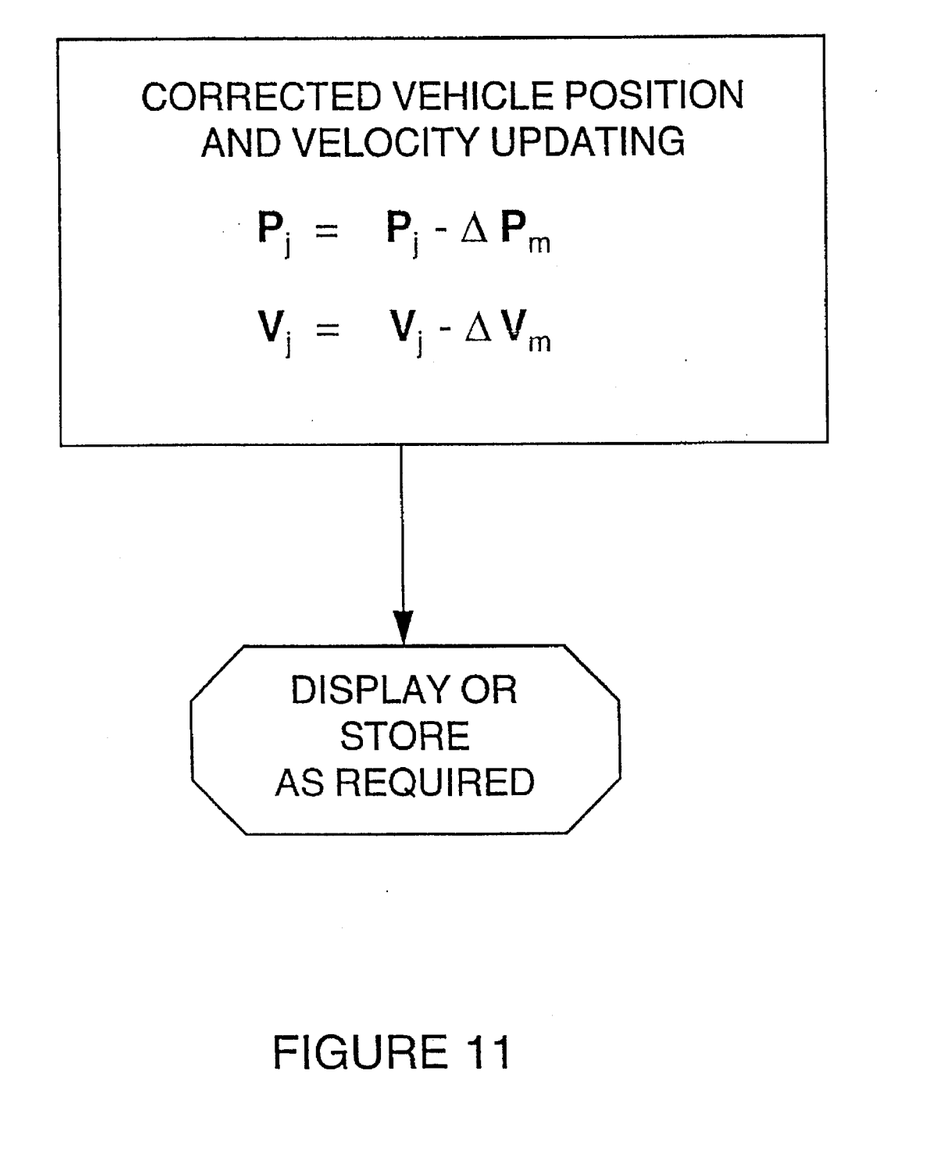
FIG. 11 illustrates the step of applying corrections.

Referring to FIG. 11, for the $j^{th}$ vehicle which utilized the m-set specific combination of satellite observables, its position and velocity are updated based on the corrections determined for a particular time tag $t_k$ as shown in FIG. 10. The corrected information may either be stored for subsequent use or displayed on the monitor of a base station computer.

Step 8. Iterate Process Flow for j+1 Data Base

The next reported vehicle data base, j+1, is examined by looping back to Step 3, and if necessary forming the next required M-set of observables and repeating Steps 3 to 7 as shown above.

Note that the corrections can be retained for any desired amount of time, or data latency, or they can be stored for non real-time post processing if desired.

Mechanization Alternatives

The process flow outlined in the above description provides an implementation which is formulated around the conventional GPS solution employing a minimum of 4 satellites or satellite signal observables to accomplish the navigation solution and the vector processing concept.

For this approach, it is possible to determine the maximum number of satellite combinations that can be obtained from the number of visible satellites by the following formula:

$$\text{Maximum } M = \frac{n \cdot (n-1) \cdot (n-2) \cdot (n-3)}{4 \cdot 3 \cdot 2 \cdot 1},$$

where n=number of visible satellites in view

The above M values are tabulated for the 4 satellites at-a-time case where n=5 through 12 according the following Table 1:

TABLE 1

| n = number of satellites | M = maximum combinations |
|---|---|
| 5 | 5 |
| 6 | 15 |
| 7 | 35 |
| 8 | 70 |
| 9 | 126 |
| 10 | 210 |
| 11 | 330 |
| 12 | 495 |

It should be noted that the rather large number of combinations shown for 10, 11, or 12 satellites are very unlikely, since for urban fleet operations, very low elevation satellites will not be visible. Also, due to geometric limitations for minimum geometric dilution of precision in satellite selection, the likelihood is that a small subset of specific combinations of the 4-tuple set of observables will be m≦M.

Vector processing in accordance with the present invention also recognizes that both the base station GPS receiver and the fleet vehicle with its GPS receiver may employ an "All-In-View" navigation solution, where 5, 6, or even up to all 12 potential satellites in view may be utilized to obtain an over-determined position and velocity navigation solution. This "All-In-View" optional mechanization is readily encompassed by simply recognizing that the selected sub-set or m-set of observables at the fleet vehicle is a number, n, greater than 4, and defining both $S_m$ and $S_m^*$ of process flow Step 4 (in the above), to be a vector of column size "n×1", rather than just 4×1. The over-determined alternative is then most readily processed by an iterative Kalman or least squares filter in the Navigation Computation blocks of Step 5.

For vector processing, the alternative usage of an "All-In-View" GPS receiver provides an economy of reduced processing to the base station processor because it reduces the potential number of maximum combinations. This may be illustrated by considering that for a 6 satellite solution, the maximum number of combinations formula becomes:

Maximum $M_6 =$ $$\frac{n \cdot (n-1) \cdot (n-2) \cdot (n-3) \cdot (n-4) \cdot (n-5)}{6 \cdot 5 \cdot 4 \cdot 3 \cdot 2 \cdot 1}$$

and as an example for n=8 visible satellites, an overdetermined solution of six observables only results in only 28 possible m-set combinations rather than the 70 required as shown in Table 1.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method for a base station of a fleet management system to generate differential GPS corrections for at least one fleet vehicle, said base station being coupled to a base station antenna and a base station GPS receiver for observing a plurality of GPS satellites, each of said plurality of GPS satellites having an identification number, said fleet vehicle using a fleet GPS receiver to generate GPS location data at a predetermined time, said GPS location data comprising a position vector $P_j$, a velocity vector $V_j$ and n satellite identification numbers with each number corresponding to a fleet-observable satellite out of said plurality of GPS satellites, where $n \geq 4$, the method comprising:

a) providing a predetermined position vector P corresponding to a position of said base station antenna;

b) receiving from said base station GPS receiver a plurality of observable signals comprising a plurality of pseudo-range signals S and a plurality of pseudo-range rate signals S* from said corresponding plurality of GPS satellites;

c) generating M group(s) of satellite identification numbers, said M representing a maximum number of ways of arranging an $n_1$-satellite group out of said n satellites observed by said fleet GPS receiver, where $n_1 \leq n$;

d) for each of said M group(s) of satellite identification numbers, selecting out of said S and S* a set of pseudo-range and pseudo-range rate signals corresponding to said group of satellite identification numbers;

e) forming M group(s) of $n_1$-by-1 vectors $S_M$* for pseudo-range signals selected from said S and $n_1$-by-1 vectors $S_M$* for pseudo-range rate signals selected from said S*;

f) for each of said M group(s) of $S_M$ and $S_M$*, converting each group of $S_M$ and $S_M$* to generate a position solution $P_M$ and a velocity solution $P_M$* corresponding to said $S_M$ and $S_M$*, respectively, corresponding to said predetermined time;

g) calculating DGPS corrections relative to said base station's position vector P, $\Delta P_M$, and velocity corrections, $\Delta V_M$, for said predetermined time, according to the following:

$$\Delta P_M = P - P_M \text{ and } \Delta V_M = P_M*,$$

wherein the DGPS position and velocity corrections for said fleet vehicle are obtained.

2. The method according to claim 1, wherein said $n_1$=4.

3. The method according to claim 1, further comprising:
applying said DGPS position and velocity corrections, $\Delta P_M$ and $\Delta V_M$, to said position vector $P_j$ and velocity vector $V_j$ to obtain corrected position and velocity vectors corresponding to said fleet vehicle.

4. The method according to claim 1, wherein said Step (f) of converting comprises applying one of closed form simultaneous equations, iterative least squares filtering estimation and iterative Kalman filtering estimation.

5. The method according to claim 2, wherein said Step (f) of converting comprises applying one of closed form simultaneous equations, iterative least squares filtering estimation and iterative Kalman filtering estimation.

6. A fleet management system for a base station to track the location of at least one fleet vehicle within a predetermined fleet area by using a plurality of GPS satellites, each of said GPS satellites having an identification, said fleet vehicle being coupled to a fleet GPS receiver for observing at least a subset, n, of said plurality of GPS satellites at a predetermined time, said fleet vehicle transmitting a position vector $P_j$, a velocity vector $V_j$ and identifications, corresponding to the identifications of said n observable GPS satellites by said fleet vehicle, said fleet management system comprising:

a base station antenna coupled to said base station for observing said plurality of GPS satellites;

a base station GPS receiver coupled to said base station antenna for receiving a plurality of pseudo-range and pseudo-range rate signals S and S* corresponding to said plurality of GPS satellites, said base station GPS receiver also generating a position vector P corresponding to said base station;

data interface coupled to said base station for receiving said position vector $P_j$, said velocity vector $V_j$ and said identifications, from said fleet vehicle;

a processor coupled to said base station for selecting, based on said identifications, a base station solution of pseudo-range signals $S_M$ and pseudo-range rate signals $S_M$* out of S and S*, respectively, for each 4-satellite combination out of said n observable GPS satellites as viewed by said fleet vehicle;

navigation computation unit coupled to said processor for generating a navigation solution of position vector and velocity vector $P_M$ and $P_M$* based on said pseudo-range signals $S_M$ and pseudo-range rate signals $S_M$* at said predetermined time;

correction unit coupled to said navigation computation for determining DGPS corrections relative to said base station's position vector P, $\Delta P_M$, and velocity corrections, $\Delta V_M$, for said predetermined time, according to the following:

$$\Delta P_M = P - P_M \text{ and } \Delta V_M = P_M*,$$

wherein the DGPS position and velocity corrections for said fleet vehicle are obtained.

7. A system according to claim 6, wherein said navigation computation unit applies one of Closed Form simultaneous equations, Iterative Least Squares filtering estimation and Iterative Kalman filtering estimation to obtain said navigation solution.

8. A system according to claim 6, further comprising:

updating unit coupled to said correction unit for applying said DGPS position and velocity corrections, $\Delta P_M$ and $\Delta V_M$, to said position vector $P_j$ and velocity vector $V_j$ to obtain corrected position and velocity vectors corresponding to said fleet vehicle.

9. A system according to claim 7, further comprising:

updating unit coupled to said correction unit for applying said DGPS position and velocity corrections, $\Delta P_M$ and $\Delta V_M$, to said position vector $P_j$ and velocity vector $V_j$ to obtain corrected position and velocity vectors corresponding to said fleet vehicle.

10. A fleet management system for a base station to provide differential GPS corrections to at least one fleet vehicle, said base station being coupled to an N-channel base station GPS receiver for observing pseudo-range and pseudo-range rate signal vectors S and S* from at most said N GPS receiver, said GPS receiver also generating a position vector P corresponding to the location of said base station, said fleet vehicle being coupled to a fleet GPS receiver for observing n GPS satellites, where n≦N, and n GPS satellites generating signals comprising uncorrected time-annotated GPS location data and identification of said n GPS satellites, said fleet vehicle transmitting said uncorrected time-annotated GPS location data and said identification to said base station, said base station being coupled to an I/O control for receiving from said fleet vehicle and generating a time-annotated vehicle data record comprising position and velocity vectors $P_j$, $V_j$ and said identification, said fleet management system comprising:

means for determining a maximum number, M, of possible satellite combinatorials out of said n satellites taken 4 at a time, according to the following equations:

$$M=n(n-1)(n-2)(n-3)/4!;$$

means for forming annotated $S_m$ and $S_m^*$ vectors where m is a specific subset of M;

means for generating $P_m$ and $P_m^*$ using navigation computation for each annotated $S_m$ and $S_m^*$ vectors;

means for calculating DGPS correction $\Delta P_m = P - P_m$ and $\Delta V_m = P_m^*$;

means for updating said uncorrected GPS location data based on:

$P'_j = P_j - \Delta P_m$ and $V'_j = V_j - \Delta V_m$, where $P'_j$ is the updated position vector and $V'_j$ is the updated velocity vector for the j-th vehicle.

11. A fleet management system according to claim 10, wherein said means of generating $P_m$ and $P_m^*$ uses navigation computation by applying one of closed form simultaneous equations, iterative least squares filtering estimation and iterative Kalman filtering estimation.

* * * * *